(12) United States Patent
MacArthur et al.

(10) Patent No.: US 10,519,009 B2
(45) Date of Patent: Dec. 31, 2019

(54) PORTABLE LIFTING ARM

(71) Applicant: Honda Motor Co., Ltd., Tokyo (JP)

(72) Inventors: Benjamin B. MacArthur, Barrie (CA); Kevin Faubert, Barrie (CA); Vaughn E. Bosley, Alliston (CA); Paul Webb, Orillia (CA)

(73) Assignee: Honda Motor Co., Ltd., Tokyo (JP)

( * ) Notice: Subject to any disclaimer, the term of this patent is extended or adjusted under 35 U.S.C. 154(b) by 383 days.

(21) Appl. No.: 15/474,185

(22) Filed: Mar. 30, 2017

(65) Prior Publication Data

US 2018/0284717 A1 Oct. 4, 2018

(51) Int. Cl.
*B66C 23/48* (2006.01)
*B66C 23/00* (2006.01)

(52) U.S. Cl.
CPC .............. *B66C 23/54* (2013.01); *B66C 23/48* (2013.01); *G05B 2219/50203* (2013.01)

(58) Field of Classification Search
CPC ......... B66C 23/54; B66C 23/48; B66F 9/061; G05B 2219/50203
See application file for complete search history.

(56) References Cited

U.S. PATENT DOCUMENTS

| | | |
|---|---|---|
| 1,674,669 A | 6/1928 | Stedman |
| 4,443,902 A | 4/1984 | Baer |
| 5,135,205 A | 8/1992 | Bedard |
| 5,784,729 A | 7/1998 | Dunn et al. |
| 6,612,548 B2 | 9/2003 | Landreth et al. |
| 8,827,216 B2* | 9/2014 | Brown ................. B25H 1/0021 248/124.1 |
| 2010/0224841 A1* | 9/2010 | Liljedahl .............. A61G 7/1017 254/120 |

FOREIGN PATENT DOCUMENTS

| | | |
|---|---|---|
| CA | 1176199 A | 10/1984 |
| CA | 2053160 A1 | 2/1993 |

(Continued)

OTHER PUBLICATIONS

"Pivoting Arm Knock-down Counterbalance Floor Crane" http://www.liftingsafety.co.uk/product/light-counter-balanced-crane-2923.html (Accessed Dec. 30, 2015).

(Continued)

*Primary Examiner* — Ryan J. Walters
(74) *Attorney, Agent, or Firm* — Honda Patents & Technologies North America, LLC; Mark E. Duell

(57) ABSTRACT

A portable lifting arm includes a base, a plurality of casters fixed to a bottom side of the base, an arm mounting structure extending upward from a top side of the base, and an arm. The arm includes a first arm segment having a first end and a second end, the first end of the first arm segment being attached to the arm mounting structure, a second arm segment having a first end and second end, the first end of the second arm segment rotationally connected to the second end of the first arm segment, and a power tool rotationally connected to the second end of the second arm segment. A controller in electrical communication the power tool selects between predetermined settings on the power tool based on a position of the first arm segment and the second arm segment relative to the arm mounting structure.

19 Claims, 8 Drawing Sheets

(56) References Cited

FOREIGN PATENT DOCUMENTS

| | | |
|---|---|---|
| CA | 2189956 C | 11/1996 |
| CN | 201664924 U | 12/2010 |
| EP | 1302607 A1 | 4/2003 |
| FR | 2543527 A1 | 10/1984 |
| GB | 548979 A | 11/1942 |
| WO | 2010123384 | 10/2010 |

OTHER PUBLICATIONS

"Carriage Mounted (Fork Truck Lifting Action) Counterbalanced Workshop Floor Crane, Hand or Powered Lift & Travel" http://www.liftingsafety.co.uk/product/hand-winch-floor-crane-2937.html (Accessed Feb. 23, 2016).

"Lift Arms" http://trade.indiamart.com/search.mp?search=lift+arms (Accessed Dec. 30, 2015).

* cited by examiner

PORTABLE LIFTING ARM

TECHNICAL FIELD

The embodiments disclosed herein are related to the field of portable tools in a manufacturing environment.

BACKGROUND

There exists a need to provide a tool in a manufacturing environment for assisting manufacturing workers with assembling articles of manufacture carried on overhead carriers.

APPLICATION SUMMARY

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

According to one aspect, a portable lifting arm includes a base having a bottom side and a top side, a plurality of casters fixed to the bottom side of the base, the base being movable on the casters, an arm mounting structure extending upward from the top side of the base, a first arm segment having a first end and a second end, the first end of the first arm segment being attached to the arm mounting structure, a second arm segment having a first end and second end, the first end of the second arm segment rotationally connected to the second end of the first arm segment, a power tool rotationally connected to the second end of the second arm segment, and a controller, the controller in electrical communication with the power tool, the controller selecting between a first predetermined setting and second predetermined setting on the power tool based on a position of the first arm segment and the second arm segment relative to the arm mounting structure.

According to another aspect, a portable lifting arm includes a base having a bottom side and a top side, a plurality of casters fixed to the bottom side of the base, the base being movable on the casters, an arm mounting structure extending upward from the top side of the base, a counterweight disposed on the bottom side of the base beneath the arm mounting structure, a first arm segment having a first end and a second end, the first end of the first arm segment being attached to the arm mounting structure, a hinge rotatably connected to the second end of the first arm segment, a second arm segment having a first end and second end, the first end of the second arm segment rotationally connected to the hinge, a power tool rotationally connected to the second end of the second arm segment, and a controller, the controller in electrical communication with the power tool, the controller selecting between a first predetermined setting and second predetermined setting on the power tool based on a position of the first arm segment and the second arm segment relative to the arm mounting structure.

According to yet another aspect, a portable lifting arm includes a base having a bottom side and a top side, a plurality of casters fixed to the bottom side of the base, the base being movable on the casters, an arm mounting structure extending upward from the top side of the base, a counterweight disposed on the bottom side of the base beneath the arm mounting structure, a first arm segment having a first end and a second end, the first end of the first arm segment being attached to the arm mounting structure, a hydraulically powered lifting arm attached to the first arm segment having a hydraulic cylinder having a cylinder barrel attached to the lifting arm and a piston rod attached to first arm segment, a hinge rotatably connected to the second end of the first arm segment and the lifting arm, a second arm segment, and a power tool rotationally connected to the second arm segment. The second arm segment includes a first segment having a first end and a second end, the first end rotatably connected to the hinge, a second segment having a first end and second end, the first end of the second segment being rotatably connected to the second end of the first segment, and a third segment having a first end and a second end, the first end of the third segment being connected to the second end of the second segment, the second segment permitting the third segment to be raised and lowered relative to the first segment.

The figures depict various embodiments for purposes of illustration only. One skilled in the art will readily recognize from the following discussion that alternative embodiments of the structures and methods illustrated herein may be employed without departing from the principles of the embodiments described herein.

DETAILED DESCRIPTION

Figure 1:
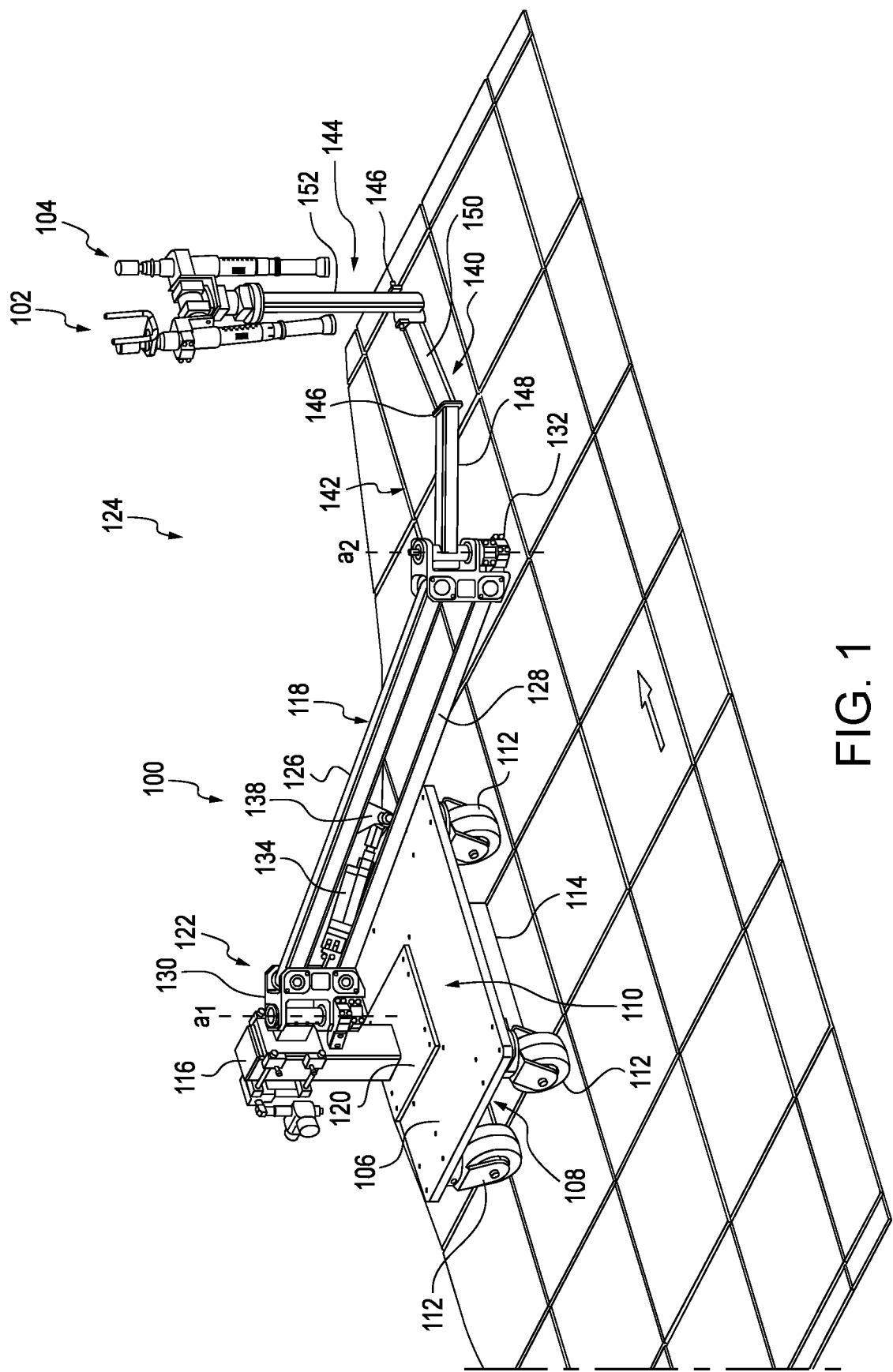
FIG. 1 is a perspective view of one embodiment of a portable lifting arm.
Figure 2:
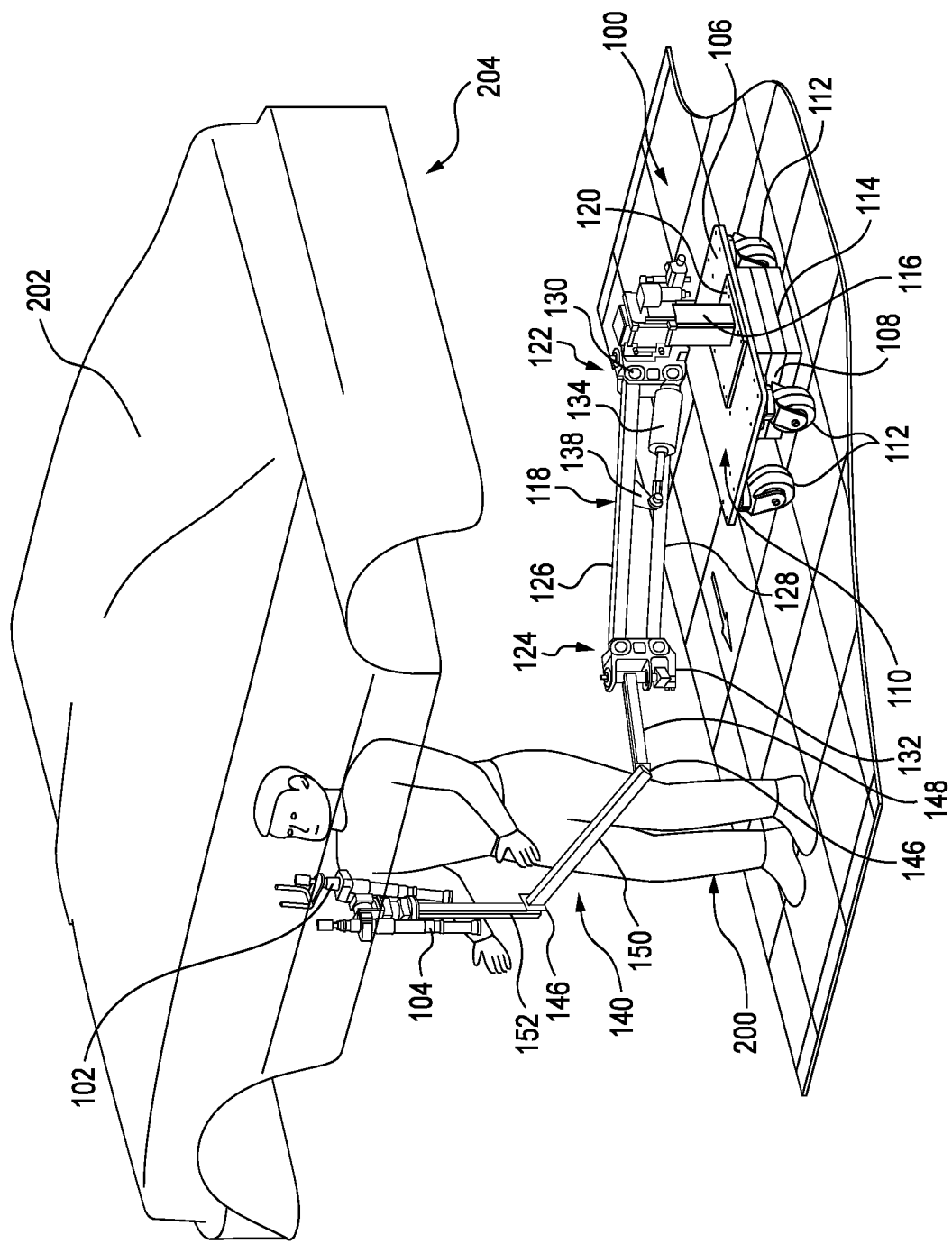
FIG. 2 is a perspective view of the portable lifting arm in a manufacturing environment.
Figure 3:
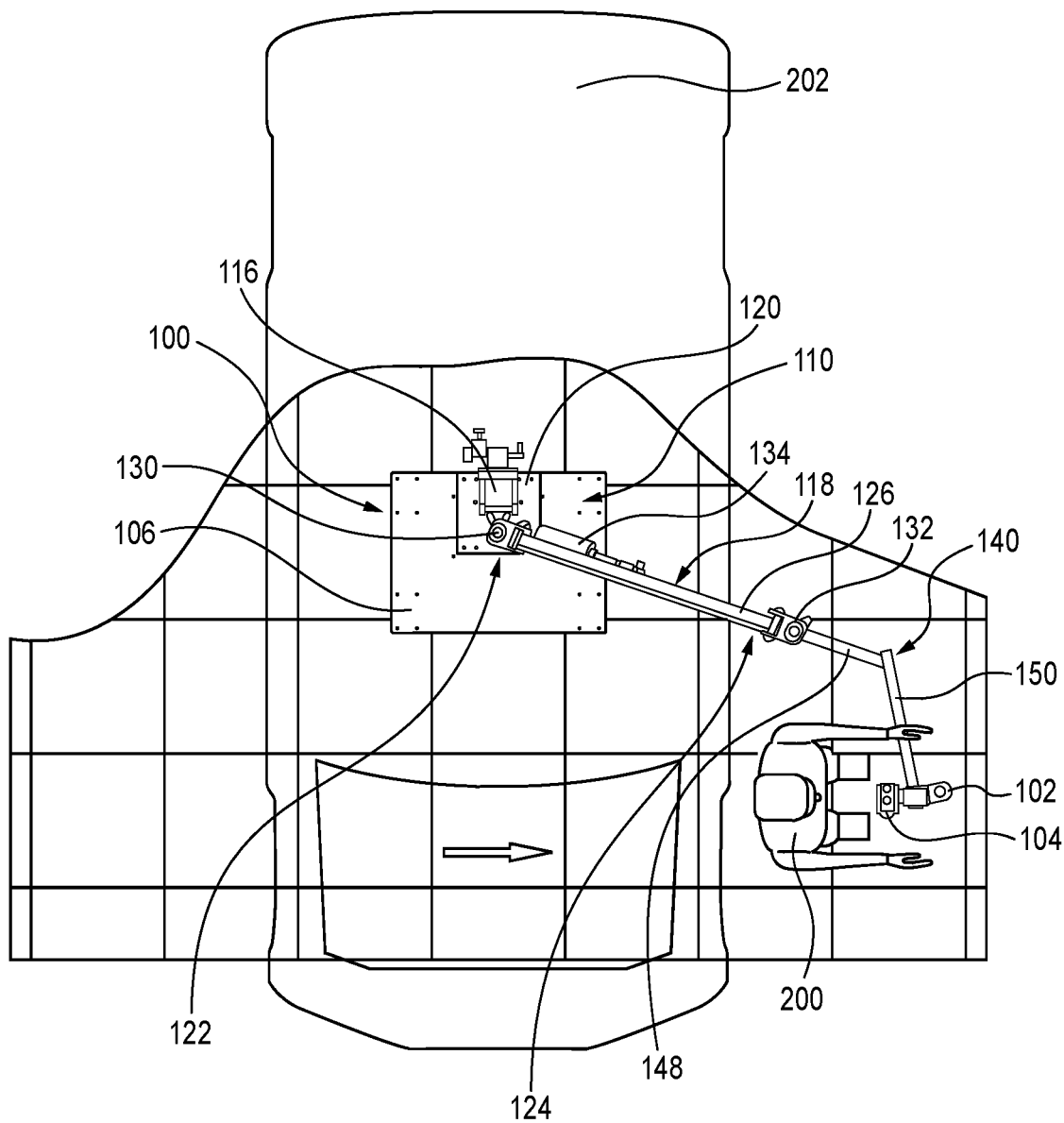
FIG. 3 is an overhead view of the portable lifting arm in the manufacturing environment.

FIGS. 1-3 illustrate a portable lifting arm 100 for use in a manufacturing environment. The portable lifting arm 100 may be used to assist a manufacturing worker 200 with the lifting of tools and parts, such as first and second power tools 102, 104, which are to be installed or used to install parts on the bottom side 204 of an article of manufacture 202, such as an automobile, positioned on an overhead conveyor in the manufacturing environment. The portable lifting arm 100 supports the weight of the first and second power tools 102, 104 while allowing a manufacturing worker 200 to maneuver the first and second power tools 102, 104 into the positions necessary to complete the assembly tasks.

As illustrated, the portable lifting arm 100 includes a base 106 having a bottom side 108 and a top side 110. A plurality of casters 112 may be fixed to the bottom side 108 of the base 106 to allow the portable lifting arm 100 to be movable on the casters 112. Being on casters 112 allows the portable lifting arm 100 to be pulled with the article of manufacture 202 in the event a tool or part to be installed becomes entangled with the article of manufacture 202. In some embodiments, the portable lifting arm 100 may include a sensor that initiates a response (e.g., activates an alarm and/or stops motion of the overhead conveyor) if the portable lifting arm 100 is moved on the casters 112 more than a predefined distance. The bottom side 108 of the base 106 may also include counterweights 114 to balance the portable lifting arm 100 and prevent the portable lifting arm 100 from tipping over when an arm segment is extended.

An arm mounting structure 116 extends upward from the top side 110 of the base 106. The arm mounting structure 116 may be formed integrally with the base 106, or may be a separate piece attached to the base 106 by suitable fasteners as illustrated in FIG. 1. The arm mounting structure 116 may be a rectangular box structure to which the first arm segment 118 is hingedly attached. Further, the arm mounting structure 116 may be attached to a plate 120, which acts as the surface that is mounted to the base 106 by the fasteners as discussed above. Moreover, the arm mounting structure 116 has a height (i.e., a distance between the top of the arm mounting structure 116 and the ground) that is low enough to allow the portable lifting arm 100 to be used underneath a lifted vehicle. The arm mounting structure 116 supports the weight of the first and second power tools from below the tools, in contrast to known lift-assist devices that support the weight of a tool or part from above the tool or part.

As previously discussed, the portable lifting arm 100 includes a first arm segment 118 having a first end 122 and a second end 124. The first end 122 of the first arm segment 118 is hingedly attached to the arm mounting structure 116. The first arm segment 118 includes a top arm 126 and a bottom arm 128, a first hinge 130 for attaching the top arm 126 and the bottom arm 128 to the arm mounting structure 116, and a second hinge 132 at the second end 124 of the first arm segment 118. The top arm 126 and bottom arm 128 are each pivotally attached to the first hinge 130 so that each the top arm 126 and bottom arm 128 may be raised and lowered. The first hinge 130 is, in turn, mounted to the arm mounting structure 116. The first hinge 130 may be fixedly mounted to the arm mounting structure 116, or the first hinge 130 may be pivotally attached to the arm mounting structure 116, thus permitting the first arm segment 118 to move or rotate horizontally about a vertical axis a1 through the first hinge 130.

Figure 4:
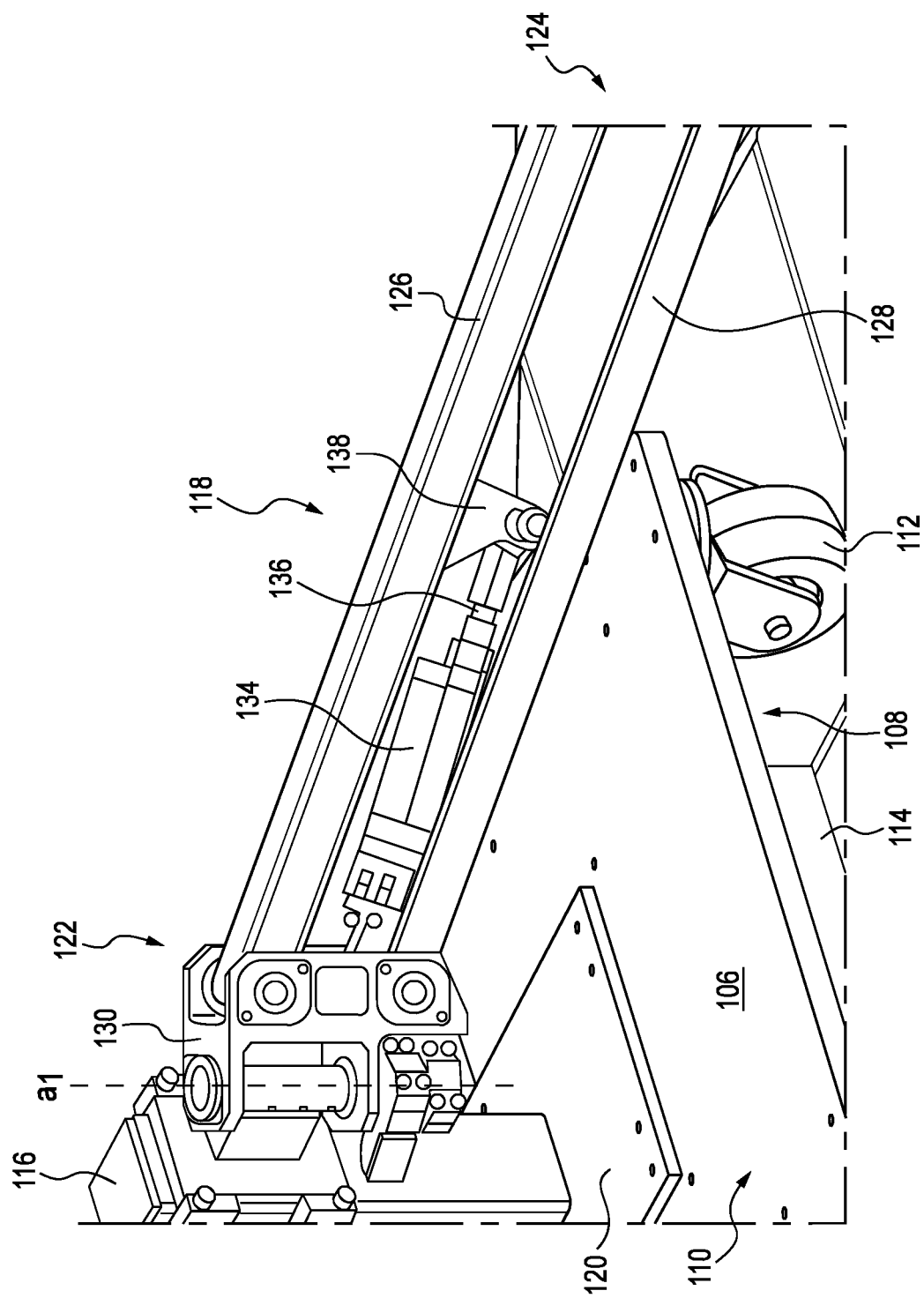
FIG. 4 is a close-up perspective view of a portion of a first arm segment of the portable lifting arm.

At the second end 124 of the first arm segment 118, the top arm 126 and the bottom arm 128 are each rotatably attached to the second hinge 132 so that each the top arm 126 and bottom arm 128 may be raised and lowered together. As illustrated in FIG. 4, the bottom arm 128 further includes a hydraulic cylinder 134 attached to the bottom arm 128 with a piston arm 136 that extends from the hydraulic cylinder 134 that is slidably attached to a pivot mount 138 in the top arm 126. As the first arm segment 118 is raised, the piston arm 136 extends, and the pivot mount 138 within the top arm 126 slidably extends towards the second end 124 of the first arm segment 118 as the second end of the first arm segment 118 raises relative to the fixed height of the first end 122 of the first arm segment 118. The hydraulic cylinder 134 operates, in a manner known to those skilled in the art, to prevent the first arm segment 118 from lowering without some release or external force applied by an operator.

A second arm segment 140, which also includes a first end 142 and second end 144, is rotationally connected to the second end 124 of the first arm segment 118 at the second hinge 132. The second arm segment 140 is rotatable in horizontal plane about an axis $a_2$ through the second hinge 132. The second arm segment 140 may have a single arm segment, or may have a plurality of arm segments 148 connected with pivot pins 146 that permit movement of the plurality of arm segments relative to each other. In the embodiment shown in the FIGS. 1-3, the second arm segment 140 includes first, second, and third segments 148, 150, 152.

Figure 5:
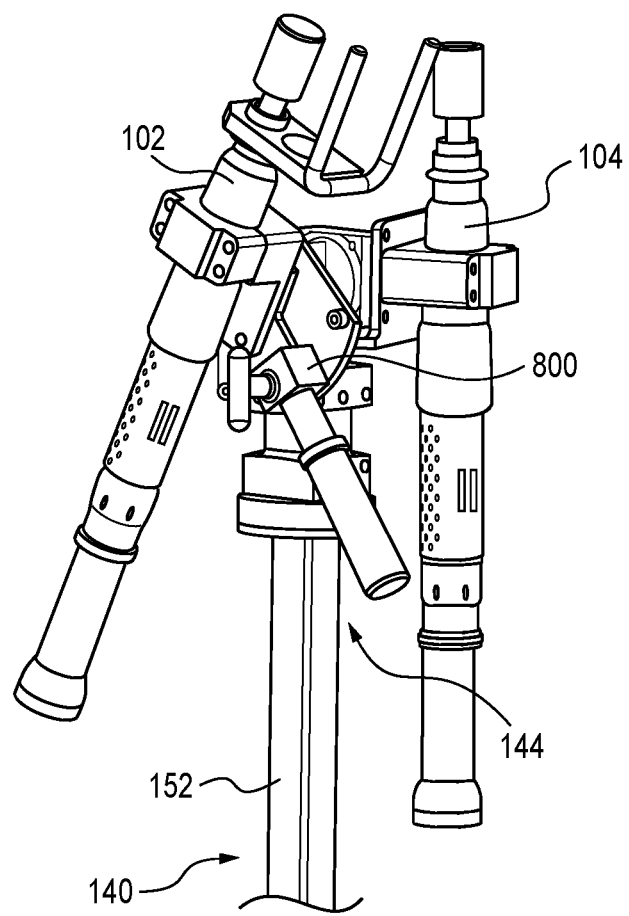
FIG. 5 is a close-up view of a portion of a second arm segment of the portable lifting arm and attached power tools.

In the embodiment illustrated in FIG. 5, a first power tool 102 and a second power tool 104 is each rotationally connected to the second end 144 of the second arm segment 140. In the embodiment illustrated, the first power tool 102 and second power tool 104 are torque guns with different settings. The torque guns are used to tighten fasteners for parts on the article of manufacture 202.

Figure 6:
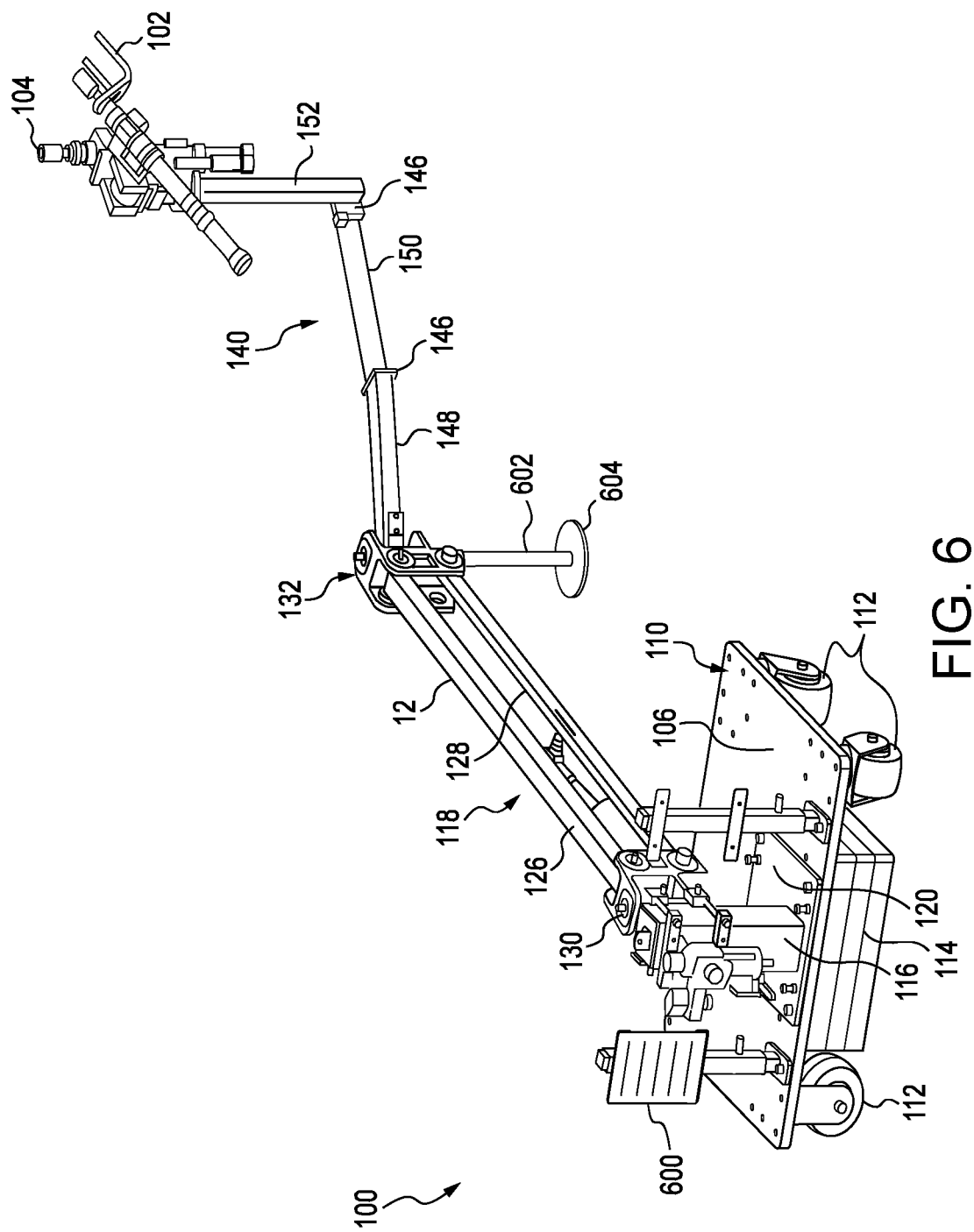
FIG. 6 is a perspective view of another embodiment of a portable lifting arm.
Figure 7:
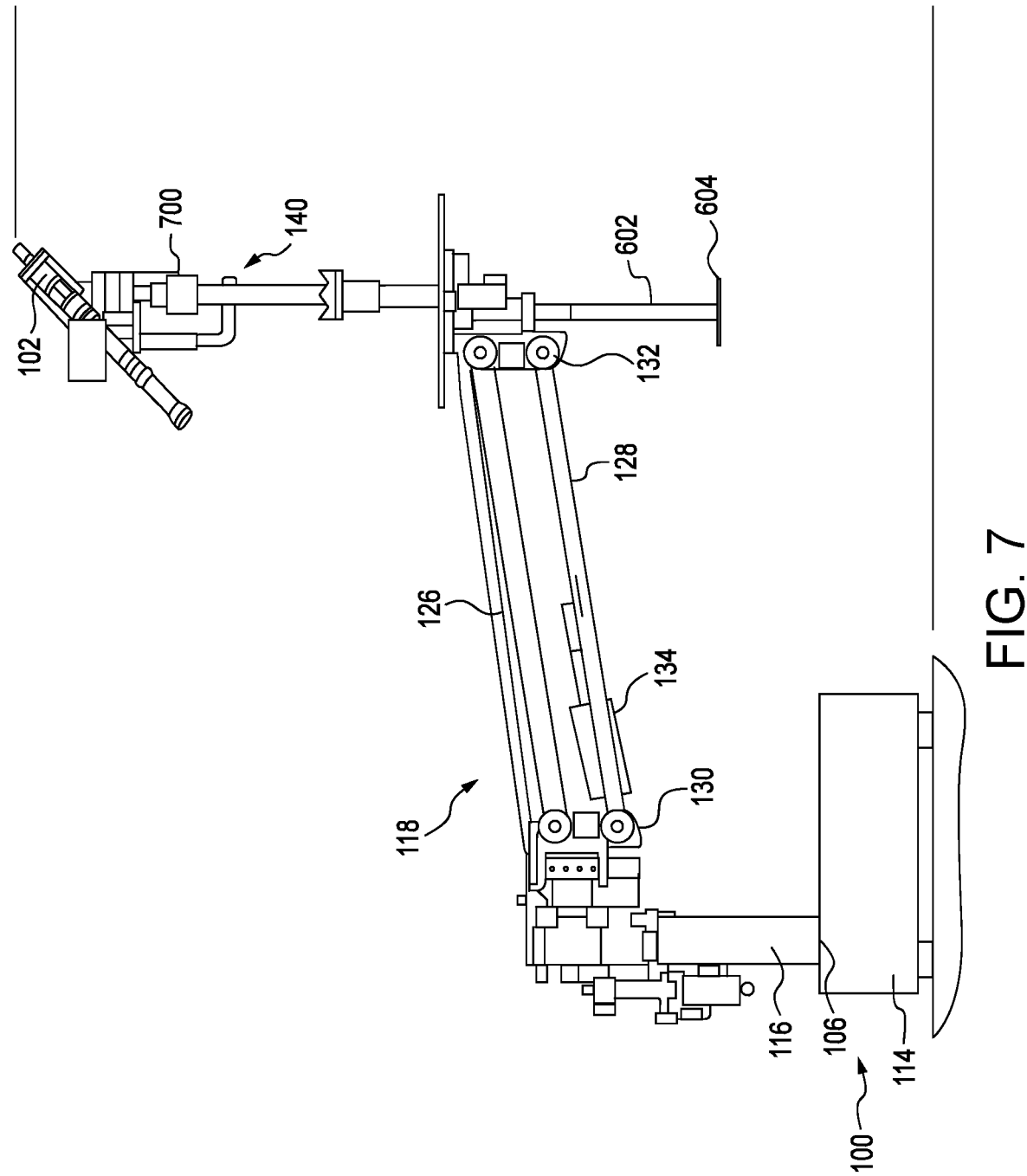
FIG. 7 is a side view of the embodiment of the portable lifting arm of FIG. 6.

In the embodiment illustrated in FIG. 6, a controller 600 in electrical communication with the first and second power tools 102, 104, is mounted to the base 106 of the portable lifting arm 100. The controller 600 may select between predetermined settings on each of the power tools 102, 104 based on a position of the first arm segment 118 and the second arm segment 140 relative to the arm mounting structure 116. The position of the first arm segment 118 and second arm segment 140 may be determined by sensors that detect the locations of the arm segments 118, 140 relative to each other and relative to the base 106. The sensors may be any type known to those skilled in the art. Further, As illustrated in FIG. 7, a sensor 700 may be located at the second end 144 of the second arm segment 140, which is in electrical communication with the controller 600, to determine the position of the second arm segment 140 and which of the first and second power tools 102, 104 is being moved for usage. Based on this data communicated to the controller 600, the predetermined settings for each of the power tools 102, 104 may be used. The controller 600 provides a predetermined setting to the power tool 102, 104 which is detected to be used by sensor 700. For example, the sensor 700 may be located in a tool mount 800 for holding the power tools 102, 104 located at the second end 144 of the second arm segment 140.

Figure 8:
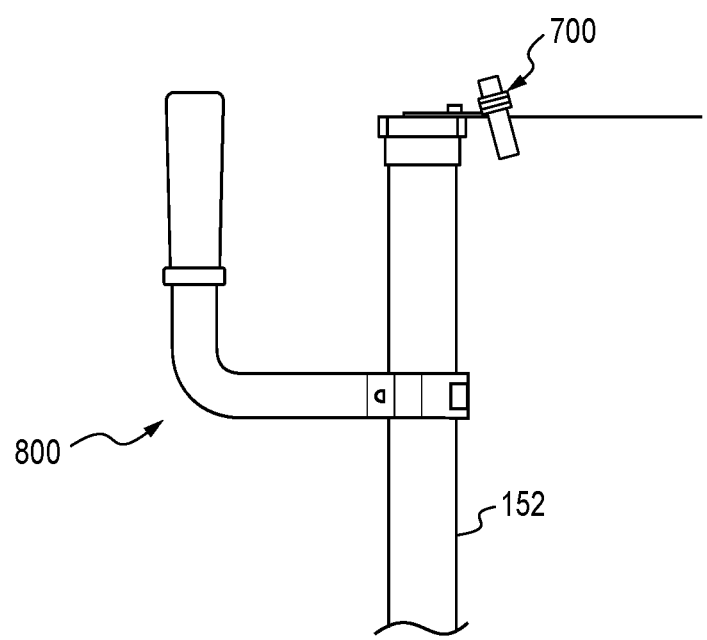
FIG. 8 is a side view of a tool mount associated with the portable lifting arm of FIG. 6.

As shown in FIG. 8, the sensor 700 may be a proximity switch which determines which one of the power tools 102, 104 is to be used by the assembly worker 200. Different torque settings dependent upon the position of the arm segments 118, 140 may be used. For example, a bolt located on a first side of the article of manufacture, such as the driver side of an automobile, may require application of a first torque value, and a bolt located on a second side of the article of manufacture, such as on the passenger side of the automobile, may require application of a second torque value. The controller 600 knows which bolt the manufacturing worker 202 is about to tighten based on a position of the arm segments 118, 140 relative to the base 106. Therefore, the controller 600 can instruct the power tools 102, 104 to apply the correct torque.

As shown in FIG. 6, in an alternate embodiment, the second hinge 132 may further be supported by a pedestal 602. The pedestal 602 is shown with a round base 604 which contacts the ground, but the pedestal 602 may alternatively include a caster (not shown) to enable the pedestal 602 to roll along the ground.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments, which is set forth in the claims.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments as defined in the appended claims.

What is claimed is:

1. A portable lifting arm, comprising:
a base having a bottom side and a top side;
a plurality of casters fixed to the bottom side of the base, the base being movable on the casters;
an arm mounting structure extending upward from the top side of the base;
a first arm segment having a first end and a second end, the first end of the first arm segment being attached to the arm mounting structure;
a second arm segment having a first end and second end, the first end of the second arm segment rotationally connected to the second end of the first arm segment;
a power tool rotationally connected to the second end of the second arm segment; and
a controller, the controller in electrical communication with the power tool, the controller selecting between a first predetermined setting and second predetermined setting on the power tool based on a position of the first arm segment and the second arm segment relative to the arm mounting structure.

2. The portable lifting arm of claim 1 further comprising:
a counterweight disposed on the bottom side of the base beneath the arm mounting structure.

3. The portable lifting arm of claim 1 further comprising:
a hinge rotatably connected to the second end of the first arm segment, the first end of the second arm segment being rotatably connected to the hinge.

4. The portable lifting arm of claim 3 further comprising:
a hydraulically powered lifting arm attached to the first arm segment.

5. The portable lifting arm of claim 4 wherein the hydraulically powered lifting arm further comprises:
a hydraulic cylinder having a cylinder barrel attached to the lifting arm and a piston rod attached to first arm segment.

6. The portable lifting arm of claim 5 wherein the hinge is rotatably connected to the lifting arm.

7. The portable lifting arm of claim 3 wherein the first arm segment is rotatable about a horizontal axis through the hinge.

8. The portable lifting arm of claim 7 wherein the second arm segment is rotatable about a vertical axis through the hinge.

9. The portable lifting arm of claim 8 further comprising:
a pedestal for supporting the hinge.

10. The portable lifting arm of claim 8 wherein the second arm segment further comprises:
a first segment, the first segment having a first end and a second end, the first end of the first segment being rotatably connected to the hinge; and
a second segment having a first end a second end, the first end of the second segment connected to the second end of the first segment, the power tool being connected to the second end of the second segment.

11. The portable lifting arm of claim 10 further comprising:
a tool mount attached to the second end of the second segment, the power tool being attached to the tool mount.

12. The portable lifting arm of claim 11 wherein the power tool is rotatably mounted to the tool mount.

13. The portable lifting arm of claim 12 further comprising:
a second power tool rotatably mounted to the tool mount.

14. The portable lifting arm of claim 10 wherein the second arm segment further comprises:
a central segment having a first end and second end, the first end of the central segment being rotatably connected to the second end of the first segment and the second end of the central segment being rotatably connected to the first end of the first segment, the central segment permitting the second segment to be raised and lowered relative to the first segment.

15. The portable lifting arm of claim 1 further comprising:
a first sensor for determining a position of the first arm segment, the first sensor in electrical communication with the controller.

16. The portable lifting arm of claim 15 further comprising:
a second sensor for determining a position of the second arm segment, the second sensor in electrical communication with the controller.

17. The portable lifting arm of claim 16 further comprising:
a third sensor for determining a position of the power tool, the third sensor in electrical communication with the controller.

18. The portable lifting arm of claim 17 wherein the first predetermined setting on the power tool is a first torque setting and the second predetermined setting on the power tool is a second torque setting.

19. A portable lifting arm, comprising:
a base having a bottom side and a top side;
a plurality of casters fixed to the bottom side of the base, the base being movable on the casters;
an arm mounting structure extending upward from the top side of the base;
a counterweight disposed on the bottom side of the base beneath the arm mounting structure;
a first arm segment having a first end and a second end, the first end of the first arm segment being attached to the arm mounting structure;
a hinge rotatably connected to the second end of the first arm segment;
a second arm segment having a first end and second end, the first end of the second arm segment rotationally connected to the hinge;
a power tool rotationally connected to the second end of the second arm segment; and
a controller, the controller in electrical communication with the power tool, the controller selecting between a first predetermined setting and second predetermined setting on the power tool based on a position of the first arm segment and the second arm segment relative to the arm mounting structure.

* * * * *